United States Patent
Yu et al.

(10) Patent No.: US 12,104,285 B2
(45) Date of Patent: Oct. 1, 2024

(54) COVERED YARN MATERIAL FOR HEATING BLANKET FELT, COVERED YARN, AND WOVEN PRODUCT THEREOF

(71) Applicant: Zhejiang Kabute Technology Co., Ltd., Hangzhou (CN)

(72) Inventors: Xiaobing Yu, Taizhou (CN); Bo Chen, Hangzhou (CN)

(73) Assignee: Zhejiang Kabute Technology Co., Ltd., Hangzhou (CN)

( * ) Notice: Subject to any disclaimer, the term of this patent is extended or adjusted under 35 U.S.C. 154(b) by 238 days.

(21) Appl. No.: 17/712,076

(22) Filed: Apr. 2, 2022

(65) Prior Publication Data

US 2022/0372661 A1 Nov. 24, 2022

(30) Foreign Application Priority Data

May 20, 2021 (CN) .......................... 202110552356.6

(51) Int. Cl.
| | |
|---|---|
| *D01D 5/34* | (2006.01) |
| *D01F 1/10* | (2006.01) |
| *D02G 3/06* | (2006.01) |
| *H05B 3/34* | (2006.01) |

(52) U.S. Cl.
CPC ................. *D01D 5/34* (2013.01); *D01F 1/10* (2013.01); *D02G 3/06* (2013.01); *H05B 3/347* (2013.01); *D10B 2331/02* (2013.01); *D10B 2331/04* (2013.01); *D10B 2401/04* (2013.01); *D10B 2503/04* (2013.01); *D10B 2503/06* (2013.01)

(58) Field of Classification Search
CPC .. C08K 2003/085; C08K 3/041; C08K 3/042; C08K 3/04; H05B 3/342–347; H05B 3/36; H05B 3/38; D01D 5/34; D01F 1/10; D02G 3/06; D10B 2331/02; D10B 2331/04; D10B 2401/04; D10B 2503/04; D10B 2503/06
See application file for complete search history.

(56) References Cited

U.S. PATENT DOCUMENTS

| | | | | |
|---|---|---|---|---|
| 4,085,182 A | * | 4/1978 | Kato ......................... | D01F 8/12 264/105 |
| 2007/0278214 A1 | * | 12/2007 | Weiss ..................... | H05B 3/342 219/545 |
| 2012/0091112 A1 | * | 4/2012 | Wei ....................... | B60N 2/5685 219/202 |
| 2019/0184673 A1 | * | 6/2019 | Agarwal ................... | B32B 5/10 |

FOREIGN PATENT DOCUMENTS

| | | | | | |
|---|---|---|---|---|---|
| CN | 107501868 A | * | 12/2017 | ............. | B29C 48/92 |
| CN | 108201877 A | * | 6/2018 | ............. | B01D 53/02 |
| CN | 108360079 A | | 8/2018 | | |
| CN | 112695396 A | | 4/2021 | | |
| WO | WO-2020075910 A1 | * | 4/2020 | ............. | C08J 3/126 |

* cited by examiner

*Primary Examiner* — Jennifer A Gillett
(74) *Attorney, Agent, or Firm* — Bayramoglu Law Offices LLC

(57) ABSTRACT

A covered yarn material for a heating blanket felt, a covered yarn, and a woven product thereof are provided. The covered yarn material includes a skin-layer material and a core-layer material, where the skin-layer material includes 20 wt % to 30 wt % of a powder melt mixture and 80 wt % to 70 wt % of a mixed-melt raw material; the core-layer material includes 100 wt % of a core-layer filament; the powder melt mixture is composed of the following components: 20 wt % of a carbon nanotube (CNT), 35 wt % of a graphite powder, 25 wt % of a copper powder, and 20 wt % of a jade ore powder; the mixed-melt raw material includes one or more from the group consisting of polyethylene terephthalate (PET), polyamide (PA) 6, PA66, polyphenylene sulfide (PPS), liquid crystal polymer (LCP), and polycarbonate (PC); and the core-layer filament includes one or more from PET, PA66, PPS, and LCP.

13 Claims, No Drawings

COVERED YARN MATERIAL FOR HEATING BLANKET FELT, COVERED YARN, AND WOVEN PRODUCT THEREOF

CROSS REFERENCE TO THE RELATED APPLICATIONS

This application is based upon and claims priority to Chinese Patent Application No. 202110552356.6, filed on May 20, 2021, the disclosure of which is incorporated herein by reference in its entirety.

TECHNICAL FIELD

The present disclosure mainly relates to the technical field of heating blankets, and in particular to a covered yarn material for a heating blanket felt, a covered yarn, and a woven product thereof.

BACKGROUND

A heating blanket felt is a fabric arranged on a surface layer and an interlayer of a heating blanket. Heat generated when an internal resistance wire of a heating blanket is energized is transferred to an external object through a heating blanket felt. The heating blanket is mainly used to increase a temperature of a quilt when people sleep and thus achieve the purpose of warming, and can also be used for dehumidification of the quilt. With the improvement of people's living standards, in addition to beautiful and warm textiles, people have begun to seek comfort, environmentally friendly, and functional health-care textiles. Therefore, the development of various functional textiles has become the mainstream of the industry.

Existing heating blanket felts face the problem of lacking functionality. The materials of the existing heating blanket felts have poor thermal conductivity, such that the overall heating rate of the heating blanket is low and keeping the heating blanket at a constant temperature consumes a lot of power, which is neither energy-efficient nor environmentally-friendly. In addition, existing heating blankets do not have the function of air purification.

SUMMARY

In order to solve the technical problems such as poor thermal conductivity and high power consumption of existing heating blanket felt materials, the present disclosure provides a covered yarn material for a heating blanket felt, a covered yarn, and a woven product thereof. Compared with the prior art, the present disclosure has functional advantages such as constant-temperature stability and low power consumption, and thus is energy-saving and environmentally friendly. Moreover, a heating current will collide with a powder combination to emit negative oxygen ions, which organically neutralize indoor formaldehyde, carbon dioxide, and the like to achieve the function of air purification.

The present disclosure adopts the following technical solutions:

The present disclosure provides a covered yarn material for a heating blanket felt, including a skin-layer material and a core-layer material, where the skin-layer material includes 20 wt % to 30 wt % of a powder melt mixture and 80 wt % to 70 wt % of a mixed-melt raw material; the core-layer material includes 100 wt % of a core-layer filament; the powder melt mixture is composed of the following components, in parts by weight: 20 wt % of a carbon nanotube (CNT), 35 wt % of a graphite powder, 25 wt % of a copper powder, and 20 wt % of a jade ore powder; the mixed-melt raw material includes one or more from the group consisting of polyethylene terephthalate (PET), polyamide (PA) 6, PA66, polyphenylene sulfide (PPS), liquid crystal polymer (LCP), and polycarbonate (PC), and the mixed-melt raw material is in a molten state; and the core-layer filament includes one or more from the group consisting of PET, PA66, PPS, and LCP, and the core-layer filament is a solid filament.

Since the powder melt mixture includes metal elements potassium, calcium, magnesium, aluminum, and manganese and carbides thereof, a skin layer made of the powder melt mixture has a strong ability to emit negative oxygen ions, which can neutralize indoor gases such as formaldehyde and carbon dioxide to realize the function of air purification. In addition, the jade ore powder adopted by the present disclosure is mainly a Xiuyan jade ore powder, and Xiuyan jade includes more than 30 trace elements such as selenium, zinc, nickel, cobalt, manganese, magnesium, and calcium that are required by the human body and are beneficial to the human body; starting waves emitted by these elements and starting waves of human cells are in the same fluctuation state, and thus human cells resonate with fluctuations emitted from jade, such that human cells and tissues become more dynamic, the blood circulation and metabolism are promoted, and the waste can be removed from the body timely, which is beneficial for health and shows a special health care function. The copper powder can improve the electrical conductivity of a heating blanket felt, and can also effectively emit negative oxygen ions to organically neutralize indoor formaldehyde, carbon dioxide, and the like. The CNT and graphite powder can achieve the physical removal of indoor formaldehyde.

The present disclosure also provides a covered yarn fabricated from the covered yarn material described above, where the powder melt mixture and PET are mixed and melted, a resulting melt is subjected to extrusion with a twin-screw extruder to form a skin layer, and the skin layer wraps the core-layer filament to obtain a PET-covered yarn, and the core-layer filament is one or two from the group consisting of PPS and LCP.

The present disclosure also provides a covered yarn fabricated from the covered yarn material described above, where the powder melt mixture and PA6 are mixed and melted, a resulting melt is subjected to extrusion with a twin-screw extruder to form a skin layer, and the skin layer wraps the core-layer filament to obtain a PA6-covered yarn; and the core-layer filament is one or more from the group consisting of PET, PA66, PPS, and LCP.

The PA6 skin-layer structure is favorable for room temperature, and is acid-dyeable, with bright and colorful colors. PA6 itself includes hygroscopic groups and can physically adsorb moisture, which is beneficial to moisture absorption and produces a cool feeling on the surface. The present disclosure also provides a covered yarn fabricated from the covered yarn material described above, where the powder melt mixture and PA66 are mixed and melted, a resulting melt is subjected to extrusion with a twin-screw extruder to form a skin layer, and the skin layer wraps the core-layer filament to obtain a PA66-covered yarn; and the core-layer filament is one or two from the group consisting of PPS and LCP.

PA66 can also retain strong strength and rigidity at high temperatures, and PA66 still has hygroscopicity after being molded. A temperature range of 250° C. to 270° C. is adopted as an actual operating hot-melting temperature range. Moreover, PA66 has excellent wear resistance and high mechanical strength.

The present disclosure also provides a covered yarn fabricated from the covered yarn material described above, where the powder melt mixture and PPS are mixed and melted, a resulting melt is subjected to extrusion with a twin-screw extruder to form a skin layer, and the skin layer wraps the core-layer filament to obtain a PPS-covered yarn; and the core-layer filament is LCP.

PPS is a sulfur-containing aromatic polymer, which has the advantages of flame retardancy, prominent thermal stability, high mechanical strength, excellent electrical performance, and the like.

The present disclosure also provides a covered yarn fabricated from the covered yarn material described above, where the powder melt mixture and LCP are mixed and melted, a resulting melt is subjected to extrusion with a twin-screw extruder to form a skin layer, and the skin layer wraps the core-layer filament to obtain a LCP-covered yarn, and the core-layer filament is LCP. Preferably, when the skin-layer material wraps the core-layer material, a mold may have a temperature of 260° C. to 335° C.

The present disclosure also provides a woven product woven from the covered yarn described above.

The woven product has the combined advantages of the covered yarn material for a heating blanket felt described above and the five kinds of covered yarns.

Preferably, the present disclosure also provides use of the covered yarn material, the covered yarn, or the woven product in mattresses, back cushions, seat cushions, sofa cushions, car cushions, and floor and wall heating substrates.

In summary, the present disclosure has the following beneficial effects:

1. The heating blanket felt material provided by the present disclosure has functional advantages such as constant-temperature stability and low power consumption, and thus is energy-saving and environmentally friendly. Moreover, a heating current will collide with a powder combination to emit negative oxygen ions, which physically and chemically adsorb indoor formaldehyde, carbon dioxide, and the like to achieve the function of air purification.

2. The 5 covered yarns made of the above-mentioned materials can produce a cool feeling on the surface, and has a special health care function and thus is beneficial to physical health.

DETAILED DESCRIPTION OF THE EMBODIMENTS

It should be noted that the examples in the present disclosure and features in the examples may be combined with each other in a non-conflicting situation. It should be noted that the terms used in the present disclosure only serve to describe specific implementations and are not intended to limit the illustrative implementations according to the present disclosure.

It should be further understood that the terms "includes" and/or "including" used in this specification specify the presence of stated features, steps, operations, elements, components, and/or a combination thereof.

Orientation or position relationships indicated by terms "center", "top", "bottom", "left", "right", "vertical", "horizontal", "inside", "outside", and the like are orientation or position relationships as shown in the accompanying drawings, and these terms are just used to facilitate the description of the present disclosure and simplify the description, but not to indicate or imply that the mentioned device or elements must have a specific orientation and must be established and operated in a specific orientation. Therefore, these terms cannot be understood as a limitation to the present disclosure.

For example, the terms "first", "second", and "third" are used only for the purpose of description, and are not intended to indicate or imply relative importance.

Unless otherwise clearly specified and limited, terms such as "arranged", "connected with", "connected to", and "fixed" should be understood in a broad sense. For example, a connection may be a fixed connection, a detachable connection, or an integrated connection; a connection may be a mechanical connection or an electrical connection; a connection may be a direct connection or an indirect connection via an intermediate medium; and a connection may be intercommunication between two components. A person of ordinary skill in the art may understand specific meanings of the foregoing terms in the present disclosure based on a specific situation.

The technical solutions in the examples of the present disclosure are described below in the examples of the present disclosure. Apparently, the described examples are merely some rather than all of the examples of the present disclosure. Therefore, the detailed description of the examples of the present disclosure is not intended to limit the protection scope of the present disclosure, but merely indicates selected examples of the present disclosure. All other examples obtained by a person skilled in the art based on the examples of the present disclosure without creative effort shall fall within the protection scope of the present disclosure.

Example 1

In order to solve the technical problem that the existing heating blanket felt materials require large power consumption and do not have the function of air purification, an example of the present disclosure provides a covered yarn material for a heating blanket felt, including a skin-layer material and a core-layer material, where the skin-layer material includes 20 wt % to 30 wt % of a powder melt mixture and 80 wt % to 70 wt % of a mixed-melt raw material; the core-layer material includes 100 wt % of a core-layer filament; the powder melt mixture is composed of the following components, in parts by weight: 20 wt % of a CNT, 35 wt % of a graphite powder, 25 wt % of a copper powder, and 20 wt % of a jade ore powder; the mixed-melt raw material includes one or more from the group consisting of PET, PA 6, PA66, PPS, LCP, and PC, and the mixed-melt raw material is in a molten state; and the core-layer filament includes one or more from the group consisting of PET, PA66, PPS, and LCP, and the core-layer filament is a solid filament.

In this example, when the CNT, graphite powder, copper powder, and jade ore powder are mixed with other raw materials, extraction and nanotechnology are used to make a resulting powder have a sub-nanoscale particle size and a particle-size normal distribution range of 60 nm to 150 nm. The uniform distribution is achieved by the following ways: 1. A dynamic continuous mixer at a rear part of a screw of a device is used. 2. An inorganic dispersant is added at an amount 1 ‰ to 3.5‰ of a total amount of the powder melt mixture. A processed skin layer has a strength of 2.1 to 4.2 CN/dtex, an elongation of 35% to 70%, and an instantaneous cool feeling value of 0.25 to 0.6. In the case of energization, because the covered yarn of the present disclosure has a large specific surface area (SSA) and a large heating area, heat is easily accumulated and the heat-producing efficiency is relatively high. Moreover, the powder melt mixture includes metal elements potassium, calcium, magnesium, aluminum, and manganese and carbides thereof, and thus the skin-layer material has a strong ability to emit negative oxygen ions, which can physically and chemically adsorb indoor gases such as formaldehyde and carbon dioxide. In the absence of electricity, in the summer with high temperatures, the skin-layer material is in contact with the human skin, and the inorganic material and the metal powder transfer heat quickly, resulting in a cool feeling.

Example 2

A powder melt mixture of a skin layer of a PET-covered yarn and PET were mixed and melted, a resulting melt was subjected to extrusion with a twin-screw extruder to obtain a skin layer, and the skin layer wrapped a core-layer filament to obtain the PET-covered yarn. The core-layer filament is one or both from the group consisting of PPS and LCP.

For the core-layer filament, the PPS filament has a specification of 250-290 dtex/96f, and the LCP filament has a diameter of 0.1 mm to 1 mm and a strength>18 CN/dtex. The skin layer is processed at a temperature of 260° C. to 270° C., and a processing time thereof determines a heating time. If the processing time is too short, the heat-setting will be insufficient; and if the processing time is too long, a quality of the yarn product will deteriorate. A processing time of 400 min to 410 min is adopted in the present disclosure. The mold temperature significantly affects the crystallinity, which in turn affects the mechanical properties of a molded product. The crystallinity is important for structural components, and thus a mold temperature of 290° C. to 335° C. is recommended. A higher mold temperature is also recommended for thin-walled molded products requiring a long process. An injection pressure of 100 MPa to 160 MPa and a back pressure of 2 Mpa to 8 Mpa are adopted. The back pressure needs to be adjusted accurately, because a too-high back pressure will cause uneven plasticization. A specific technological process is the common knowledge of those skilled in the art, which will not be repeated here.

Example 3

A powder melt mixture and PA6 were mixed and melted, a resulting melt was subjected to extrusion with a twin-screw extruder to form a skin layer, and the skin layer wrapped a core-layer filament to obtain a PA6-covered yarn. The core-layer filament is one or more from the group consisting of PET, PA66, PPS, and LCP.

In this example, specifications of the core-layer filaments PPS and LCP are as described in Example 1, the core-layer filament PET has a specification of 150-200 dtex/96f, and the PA6 has a specification of 200-250 dtex/36f; and the skin layer is processed at 240° C. to 250° C. for 150 min to 160 min. In this example, the wrapping of the skin-layer material around the core-layer material is conducted at 270° C. to 325° C.; and an injection pressure of 100 MPa to 160 MPa and a back pressure of 2 MPa to 8 MPa are adopted. The PA6 skin layer has a bright and colorful color. PA6 itself includes hygroscopic groups and can physically adsorb moisture, which is beneficial to moisture absorption and produces a cool feeling on the surface.

Example 4

A powder melt mixture and PA66 were mixed and melted, a resulting melt was subjected to extrusion with a twin-screw extruder to form a skin layer, and the skin layer wrapped a core-layer filament to obtain a PA66-covered yarn. The core-layer filament is one or both from the group consisting of PPS and LCP.

In this example, specifications of the core-layer filaments PPS and LCP are as described in Example 1, and the skin layer is processed at 250° C. to 270° C. for 140 min to 155 min. In this example, a mold temperature for the wrapping of the skin layer is 280° C. to 330° C., and an injection pressure of 80 MPa to 120 MPa and a back pressure of 2 MPa to 6 MPa are adopted. PA66 can also retain strong strength and rigidity at high temperatures, and PA66 still has hygroscopicity after being molded. Moreover, PA66 has excellent wear resistance and high mechanical strength.

Example 5

A powder melt mixture and PPS were mixed and melted, a resulting melt was subjected to extrusion with a twin-screw extruder to form a skin layer, and the skin layer wrapped a core-layer filament to obtain a PPS-covered yarn. The core-layer filament is LCP.

The skin layer is processed at 300° C. to 330° C. for 410 min to 430 min. In this example, a mold temperature for the wrapping of the skin layer is 260° C. to 300° C., and an injection pressure of 80 MPa to 120 MPa and a back pressure of 3 MPa to 8 MPa are adopted. PPS is a sulfur-containing aromatic polymer, which has the advantages of flame retardancy, prominent thermal stability, high mechanical strength, excellent electrical performance, and the like.

Example 6

A powder melt mixture and LCP were mixed and melted, a resulting melt was subjected to extrusion with a twin-screw extruder to form a skin layer, and the skin layer wrapped a core-layer filament to obtain an LCP-covered yarn. The core-layer filament is LCP.

In this example, a specification of the core-layer filament LCP is as described in Example 1, and the skin layer is processed at 350° C. to 380° C. for 430 min to 450 min. In this example, a mold temperature for the wrapping of the skin layer is 280° C. to 315° C., and an injection pressure of 100 MPa to 150 MPa and a back pressure of 4 MPa to 10 MPa are adopted. LCP has fully-aromatic polyester and copolyester structures, and also has a densely-arranged linear polymer chain structure, making a product have prominent thermal insulation performance.

Example 7

The present disclosure also provides a woven product woven from the covered yarn, which has functional advantages such as constant-temperature stability and low power consumption, and thus is energy-saving and environmentally friendly. Moreover, a heating current will collide with a powder combination to emit negative oxygen ions, which physically and chemically adsorb indoor formaldehyde, carbon dioxide, and the like to achieve the function of air purification.

1. Comparison of performance parameters between the conventional heating blanket felt and the heating blanket felt of the present disclosure:

| Material | Heating rate (35° C.) | Power consumption (6 h) |
| --- | --- | --- |
| Conventional heating blanket felt | 12-15 min | 0.3-0.6 kW |
| Heating blanket felt of the present disclosure | 3-5 min | 0.25 kW |

In this example, because the skin layer of the covered yarn is made of a composite conductive powder (CNT, graphite powder, copper powder, and jade ore powder), the specific surface heat conduction area is large, and the structure of the skin layer wrapping the core-layer filament is not easy to lose heat.

2. In a 20 m² room, 2.5 m² of the heating blanket felt involved in this example (as a reference object) can continuously produce 6,000 to 10,000 negative oxygen ions/cm², which reduces a formaldehyde content by 0.02 to 0.03 mg/m³ and reduces a $CO_2$ content by 0.01% to 0.02% based on a total atmospheric volume. The principle has been mentioned in Example 1, which will not be repeated here.

The above-mentioned examples merely illustrate the principles and effects of the present disclosure, but are not intended to limit the present disclosure. Any person skilled in the art can make modifications or alterations to the above examples without departing from the spirit and scope of the present disclosure. Hence, all equivalent modifications or changes made by those of ordinary skill in the art without departing from the spirit and technical teachings disclosed in the present disclosure should fall within the scope defined by appended claims of the present disclosure.

What is claimed is:

1. A covered yarn for a heating blanket felt, comprising a skin layer and core layer, wherein
   the skin layer comprises 20 wt % to 30 wt % of a powder mixture and 80 wt % to 70 wt % of a mixed-melt material;
   the core layer comprises 100 wt % of a core-layer filament;
   the powder mixture is composed of the following components: 20 wt % of a carbon nanotube (CNT), 35 wt % of a graphite powder, 25 wt % of a copper powder, and 20 wt % of a jade ore powder;
   the mixed-melt material comprises one or more from the group consisting of polyethylene terephthalate (PET), polyamide (PA) 6, PA66, polyphenylene sulfide (PPS), liquid crystal polymer (LCP), and polycarbonate (PC); and
   the core-layer filament comprises one or more from the group consisting of PET, PA66, PPS, and LCP, and the core-layer filament is a solid filament.

2. The covered yarn according to claim 1, wherein PET is used as the mixed-melt material, the covered yarn is made by a process comprising mixing the powder mixture and the mixed-melt material and then melting to obtain a resulting melt, the resulting melt is subjected to an extrusion with a twin-screw extruder to form the skin layer, and the skin layer wraps the core-layer filament to obtain a PET-covered yarn; and wherein the core-layer filament is one or two from the group consisting of PPS and LCP.

3. The covered yarn according to claim 1, wherein PA6 is used as the mixed melt material, the covered yarn is made by a process comprising mixing the powder mixture and the mixed-melt material and then melting to obtain a resulting melt, the resulting melt is subjected to an extrusion with a twin-screw extruder to form the skin layer, and the skin layer wraps the core-layer filament to obtain a PA6-covered yarn.

4. The covered yarn according to claim 1, wherein PA66 is used as the mixed-melt material, the covered yarn is made by a process comprising mixing the powder mixture and the mixed-melt material and then melting to obtain a resulting melt, the resulting melt is subjected to an extrusion with a twin-screw extruder to form the skin layer, and the skin layer wraps the core-layer filament to obtain a PA66-covered yarn; and wherein the core-layer filament is one or two from the group consisting of PPS and LCP.

5. The covered yarn according to claim 1, wherein PPS is used as the mixed-melt material, the covered yard in made by process comprising mixing the powder mixture and the mixed-melt material and then melting to obtain a resulting melt, the resulting melt is subjected to an extrusion with a twin-screw extruder to form the skin layer, and the skin layer wraps the core-layer filament to obtain a PPS-covered yarn; and wherein the core-layer filament is LCP.

6. The covered yarn according to claim 1, wherein LCP is used as the mixed-melt material, the covered yarn is made by a process comprising mixing the powder mixture and the mixed-melt material and then melting to obtain a resulting melt, the resulting melt is subjected to an extrusion with a twin-screw extruder to form the skin layer, and the skin layer wraps the core-layer filament to obtain an LCP-covered yarn; and wherein the core-layer filament is LCP.

7. The covered yarn according to claim 2, wherein the skin layer wraps the core-layer filament by using a mold at a temperature of 260° C. to 335° C.

8. A woven product, wherein the woven product is woven from one or more selected from the group consisting of a PET-covered yarn, a PA6-covered yarn, a PA66-covered yarn, a PPS-covered yarn, and an LCP-covered yarn, wherein
   each of the PET-covered yarn, the PA6-covered yarn, the PA66-covered yarn, the PPS-covered yarn, and the LCP-covered yarn comprises a skin layer and a core layer, wherein
   the skin layer comprises 20 wt % to 30 wt % of a powder mixture and 80 wt % to 70 wt % of a mixed-melt material;
   the core layer comprises 100 wt % of a core-layer filament;
   the powder mixture is composed of the following components: 20 wt % of a CNT, 35 wt % of a graphite powder, 25 wt % of a copper powder, and 20 wt % of a jade ore powder;
   the mixed-melt material comprises one or more from the group consisting of PET, PA 6, PA66, PPS, LCP, and PC; and
   the core-layer filament comprises one or more from the group consisting of PET, PA66, PPS, and LCP, and the core-layer filament is a solid filament;
   wherein the PET-covered yarn is obtained by mixing and melting the powder mixture and the PET used as the mixed-melt material to obtain a first resulting melt, subjecting the first resulting melt to an extrusion with a twin-screw extruder to form a first skin layer, and wrapping the core-layer filament with the first skin layer to obtain the PET-covered yarn; wherein the core-layer filament is one or two from the group consisting of PPS and LCP;
   wherein the PA6-covered yarn is obtained by mixing and melting the powder mixture and the PA6 to obtain a second resulting melt, subjecting the second resulting melt to the extrusion with the twin-screw extruder to form a second skin layer, and wrapping the core-layer filament with the second skin layer to obtain the PA6-covered yarn;

wherein the PA66-covered yarn is obtained by mixing and melting the powder mixture and the PA66 used as the mixed-melt material to obtain a third resulting melt, subjecting the third resulting melt to the extrusion with the twin-screw extruder to form a third skin layer, and wrapping the core-layer filament with the third skin layer to obtain the PA66-covered yarn; wherein the core-layer filament is one or two from the group consisting of PPS and LCP;

wherein the PPS-covered yarn is obtained by mixing and melting the powder mixture and the PPS used as the mixed-melt material to obtain a fourth resulting melt, subjecting the fourth resulting melt to the extrusion with the twin-screw extruder to form a fourth skin layer, and wrapping the core-layer filament with the fourth skin layer to obtain the PPS-covered yarn; wherein the core-layer filament is LCP; and wherein the LCP-covered yarn is obtained by mixing and melting the powder mixture and the LCP used as the mixed-melt material to obtain a fifth resulting melt, subjecting the fifth resulting melt to the extrusion with the twin-screw extruder to form a fifth skin layer, and wraps the core-layer filament with the fifth skin layer to obtain the LCP-covered yarn; wherein the core-layer filament is LCP.

9. A method for using the covered yarn according to claim 1, comprising:

weaving the covered yarn into a woven product, and fabricating mattresses, back cushions, seat cushions, sofa cushions, car cushions, or floor and wall heating substrates with the woven product.

10. The covered yarn according to claim 3, wherein the skin layer wraps the core-layer filament by using a mold at a temperature of 260° C. to 335° C.

11. The covered yarn according to claim 4, wherein the skin layer wraps the core-layer filament by using a mold at a temperature of 260° C. to 335° C.

12. The covered yarn according to claim 5, wherein the skin layer wraps the core-layer filament by using a mold at a temperature of 260° C. to 335° C.

13. The covered yarn according to claim 6, wherein the skin layer wraps the core-layer filament by using a mold at a temperature of 260° C. to 335° C.

* * * * *